(12) United States Patent
Sridhar et al.

(10) Patent No.: US 8,837,295 B2
(45) Date of Patent: Sep. 16, 2014

(54) DIAGNOSTIC TOOL AND METHOD FOR RETRIEVING SUBSCRIBER INFORMATION FROM NODES LOCATED WITHIN A LAYER 2 AGGREGATION NETWORK

(75) Inventors: Kamakshi Sridhar, Plano, TX (US); Marcus K. Weldon, Summit, NJ (US); Johan Van Besouw, Surry Hills (AU); Ludwig Pauwels, Beveren (BE); Sven Ooghe, Gentbrugge (BE)

(73) Assignee: Alcatel Lucent, Paris (FR)

( * ) Notice: Subject to any disclaimer, the term of this patent is extended or adjusted under 35 U.S.C. 154(b) by 995 days.

(21) Appl. No.: 11/746,038

(22) Filed: May 8, 2007

(65) Prior Publication Data
US 2008/0279107 A1    Nov. 13, 2008

(51) Int. Cl.
*H04L 12/26* (2006.01)

(52) U.S. Cl.
USPC ............................... 370/241; 375/224

(58) Field of Classification Search
USPC .................................. 370/252, 254
See application file for complete search history.

(56) References Cited

U.S. PATENT DOCUMENTS

| | | | |
|---|---|---|---|
| 6,963,575 B1 * | 11/2005 | Sistanizadeh et al. ........ | 370/404 |
| 7,457,289 B2 * | 11/2008 | Wang ............................ | 370/392 |
| 7,768,928 B2 * | 8/2010 | Harel et al. .................. | 370/241.1 |
| 7,821,949 B2 * | 10/2010 | Mohan et al. ............... | 370/241.1 |
| 2002/0138852 A1 * | 9/2002 | Reynolds et al. ............. | 725/136 |
| 2004/0100949 A1 * | 5/2004 | Bennett .......................... | 370/384 |
| 2006/0098670 A1 * | 5/2006 | Voit et al. ...................... | 370/401 |
| 2008/0089244 A1 * | 4/2008 | Yu .................................. | 370/255 |
| 2008/0095173 A1 * | 4/2008 | Bugenhagen ............. | 370/395.21 |
| 2008/0109481 A1 * | 5/2008 | Catanzariti et al. ........ | 707/104.1 |
| 2008/0144622 A1 * | 6/2008 | Platnic .......................... | 370/390 |
| 2009/0279701 A1 * | 11/2009 | Moisand et al. ............. | 380/270 |
| 2013/0329729 A1 * | 12/2013 | Mehta et al. ................. | 370/390 |

OTHER PUBLICATIONS

Sridhar K. et al., "End-to-End Ethernet Connectivity Fault Management in Metro and Access Networks", Jun. 30, 2005, XP002346929.*
IEEE P802.1ag/D5.2 Virtual Bridged Local Area Networks—Amendment 5: Connectivity Fault Management, 137 pages, Dec. 6, 2005.
U.S. Appl. No. 11/745,001, filed May 7, 2007, GPON OAM Using IEEE 802.1ag Methodology.

* cited by examiner

*Primary Examiner* — Mohammad Adhami
(74) *Attorney, Agent, or Firm* — Capitol Patent & Trademark Law Firm, PLLC (57) ABSTRACT

An in-band diagnostic tool and method are described herein that are capable of retrieving subscriber information from one or more nodes located within a layer 2 aggregation network. In one application, the diagnostic tool and method can be used by a customer service representative to retrieve subscriber information (e.g., user privileges, current bandwidth usage, available bandwidth) related to a customer that receives television, Internet etc. from an Internet Protocol Television (IPTV) network (which is an application-specific layer 2 aggregation network).

7 Claims, 9 Drawing Sheets

DIAGNOSTIC TOOL AND METHOD FOR RETRIEVING SUBSCRIBER INFORMATION FROM NODES LOCATED WITHIN A LAYER 2 AGGREGATION NETWORK

CROSS-REFERENCE TO RELATED APPLICATIONS

This U.S. Nonprovisional Application for Patent claims the benefit of the filing date of U.S. Nonprovisional Application for Patent entitled, "GPON OAM Using IEEE 802.1ag Methodology", having Ser. No. 11/745,001, filed on May 7, 2007, which is incorporated herein by reference for all purposes.

TECHNICAL FIELD

The present invention relates to an in-band diagnostic tool and a method for retrieving subscriber information (e.g., static subscriber information, dynamic subscriber information) from one or more nodes located within a layer 2 aggregation network.

BACKGROUND

The following abbreviations are herewith defined, at least some of which are referred to in the following description associated with the prior art and the present invention.
AN Access Node
CC Continuity Check
Co Central Office
DSLAM Digital Subscriber Line Access Multiplexer
FDB Forwarding Database
GDA Group Destination Address
IP Internet Protocol
IPTV Internet Protocol Television
IO Intermediate Office
MAC Media Access Control
MEP Maintenance End Point
MIP Maintenance Intermediate Point
RGW Residential Gateway
SAI Service Area Interface
SHE Super Headend
STB Set-Top Box
TV Television
TLV Type Length Value
VHO Video Hub Office
VLAN Virtual Local Area Network An in-band diagnostic tool is needed that can be used to retrieve user subscription data from the nodes on a path between a given source node (source MEP) and a given destination node (destination MEP) within a layer 2 aggregation network. Today, out-of-band diagnostic tools exist which can retrieve user subscription data but these out-of-band diagnostic tools require a common network management system which functions across different types of product platforms to retrieve user subscription data from the nodes on the path between the source MEP and the destination MEP within the layer 2 aggregation network. The out-of-band diagnostic tools can be difficult to implement because they use a common network management system which needs to function across different types of product platforms. Thus, the need for an in-band diagnostic tool which can retrieve user subscription data without requiring the tedious procedures associated with using the traditional out-of-band diagnostic tools. This need and other needs are satisfied by the present invention.

SUMMARY

An in-band diagnostic tool and a method are described herein which are capable of retrieving subscriber information from one or more nodes located within a layer 2 aggregation network. In one embodiment, the diagnostic tool can retrieve information about a subscriber from one or more nodes located within a layer 2 aggregation network by: (1) creating a request message which contains information including a MAC address that is associated with a target device (note: the target device is used by the subscriber); (2) sending the request message via one or more nodes towards the target device; (3) receiving one or more reply messages from the one or more nodes and possibly the target device (note: the reply messages could contain static subscriber information (e.g., user privileges) and dynamic subscriber information (e.g., current bandwidth usage, available bandwidth)); and (4) analyzing/presenting the subscriber information contained within the reply message(s) which are received from the node(s) and possibly the target device.

BRIEF DESCRIPTION OF THE DRAWINGS

A more complete understanding of the present invention may be obtained by reference to the following detailed description when taken in conjunction with the accompanying drawings wherein.

DETAILED DESCRIPTION

Figure 1:
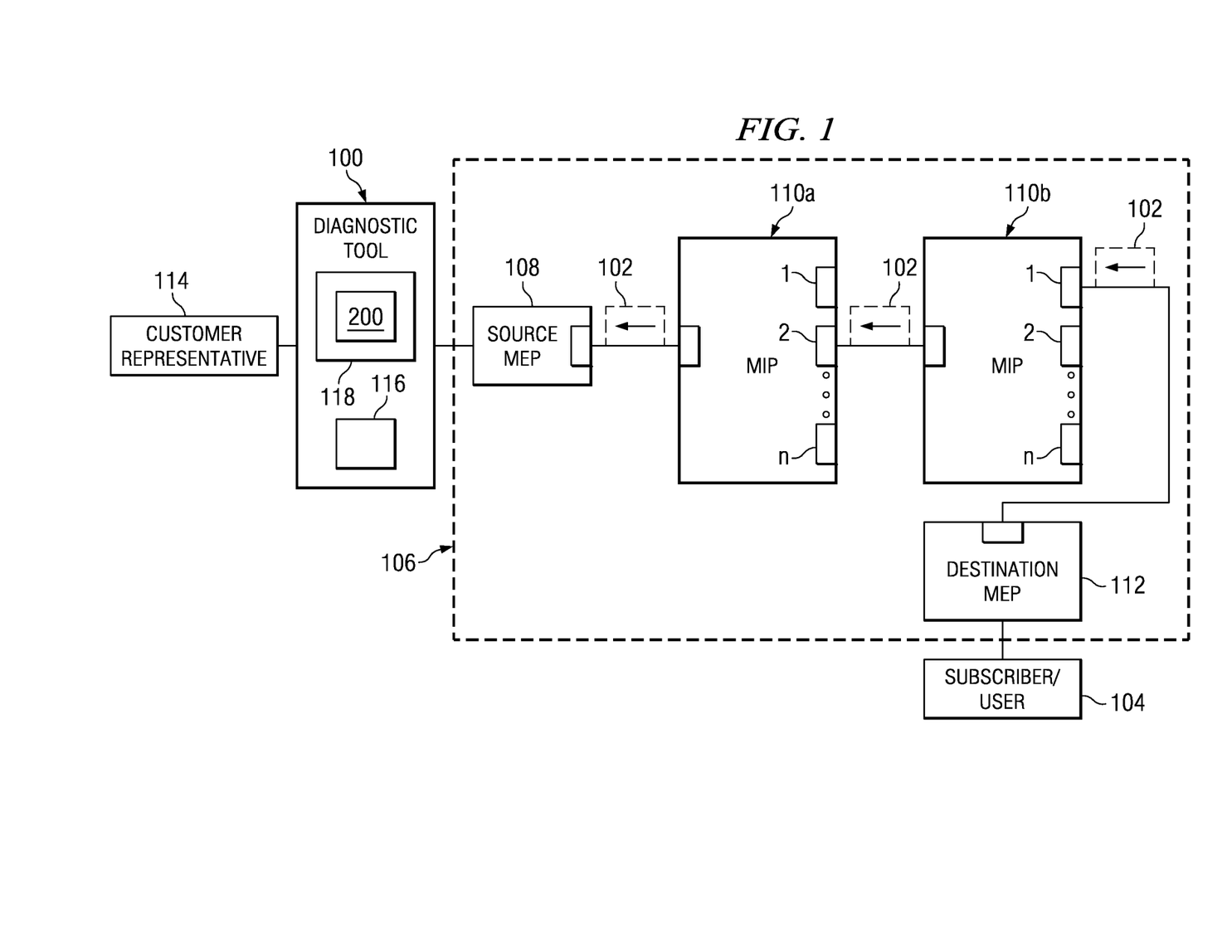
FIGS. 1-4 are diagrams which are used to help explain how an in-band diagnostic tool and method can be used to retrieve subscriber information from one or more nodes located in a layer 2 aggregation network in accordance with the present invention.

Referring to FIGS. 1-4, there are several diagrams which are provided to help explain how an in-band diagnostic tool 100 and method 200 can be used to retrieve user subscription data 102 associated with a subscriber 104 (user/member 104) from one or more nodes within a layer 2 aggregation network 106. In FIG. 1, there is shown a block diagram of an exemplary layer 2 aggregation network 106 which has a source MEP 108 that is connected to a first MIP 110*a* (which includes ports 1, 2 . . . n). The first MIP 110*a* is connected to a second MIP 110*b* (which includes ports 1, 2 . . . n) which in turn is connected to a destination MEP 112 (which is associated with the particular subscriber/user 104). As shown, the diagnostic tool 100 (which includes an operator interface 116 and a computer 118) is connected to the source MEP 108. For clarity, this exemplary layer 2 aggregation network 106 has a simple architecture however it should be appreciated that the network would typically have a much more complex architecture and include a large number of interconnected MEPs and MIPs.

Basically, the diagnostic tool 100 is used to retrieve subscriber information 102 about a particular subscriber 104 from nodes 110*a* and 110*b* which are located on the path of a multicast VLAN from the source MEP 108 to the destination MEP 112 (note: the destination MEP 112 may also provide some subscriber information 102). To accomplish this, the diagnostic tool 100 would implement method 200 as is discussed below with respect to FIGS. 2-4. In one embodiment, a person 114 (customer service representative 114) would interface with and use the diagnostic tool 100 to retrieve different types of subscriber information 102 such as transmission speeds (e.g., downstream/upstream bandwidth available, downstream/upstream bandwidth usage) and entitlement information (e.g., permission to use Internet service, video-conferencing service, television service etc. . . . ) associated with the subscriber 104. Typically, before the customer service representative 114 would attempt to retrieve the subscriber information 102, the subscriber 104 would contact the customer service representative 114 and let them know they are experiencing a problem such as they are not able to receive a voice call or they are not able to take part in a video conference etc. . . .

At this point, the customer service representative 114 would look-up a port ID (at the destination MEP 112) that is associated with the subscriber 104. Then, the customer service representative 114 would input the port ID into the diagnostic tool 100 and perform a discovery process to: (1) learn a MAC address of the destination MEP 112; and (2) learn the direct path through the MIPS 110a and 110b to the destination MEP 112 (see step 202 in FIG. 2). This particular information is needed before the diagnostic tool 100 can be used to retrieve the desired subscriber information 102. FIG. 3 is a diagram which is used to help explain one way that the diagnostic tool 100 can obtain this particular information by having the source MEP 108 flood a MAC discover message 120 (which contains the user's port ID) through-out the layer 2 aggregation network 106.

In particular, the source MEP 108 sends a MAC discover message 120 towards the first MIP 110a which then forwards the MAC discover message 120 out-off every one of it's local ports 1, 2 . . . n. Thereafter, the second MIP 110b receives and forwards the MAC discover message 120 out-off every one of its local ports 1, 2 . . . n. The destination MEP 112 eventually receives the MAC discover message 120 and in response it sends a MAC reply message 122 directly back to the source MEP 108 via the MIPs 110a and 110b. Once, the MIP 110b receives the MAC reply message 122 it now knows which one of it's local ports 1, 2 . . . n (e.g., port 1) behind which resides the destination MEP 112 (which is associated with the subscriber 104). Then, the MIP 110b creates an entry 124b which includes [destination MEP's MAC address, local port] within a database 126b (e.g., a FDB 126b). Likewise, when the MIP 110a receives the MAC reply message 122 it now knows which one of it's local ports 1, 2 . . . n (e.g., port 2) behind which resides the destination MEP 112 (which is associated with the subscriber 104). The MIP 110a also creates an entry 124a which includes [destination MEP's MAC address, local port] within a database 126a (e.g., a FDB 126a). Lastly, the MIP 110a forwards the MAC reply message 122 to the source MEP 108. This particular discovery process is known in the art as Ethernet MAC learning (note: this MAC discovery process does not need to be performed if IEEE 802.1ag connectivity check messages or the like are being continuously exchanged between the source MEP 108 and the destination MEP 110).

Figure 2:
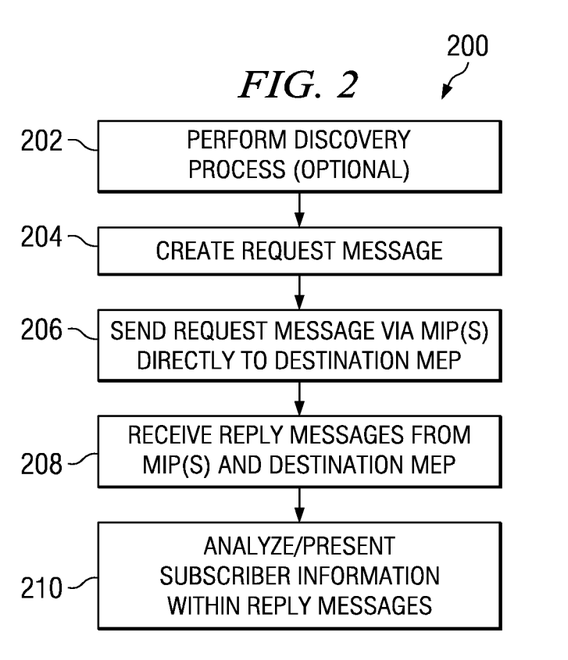
Figure 3:
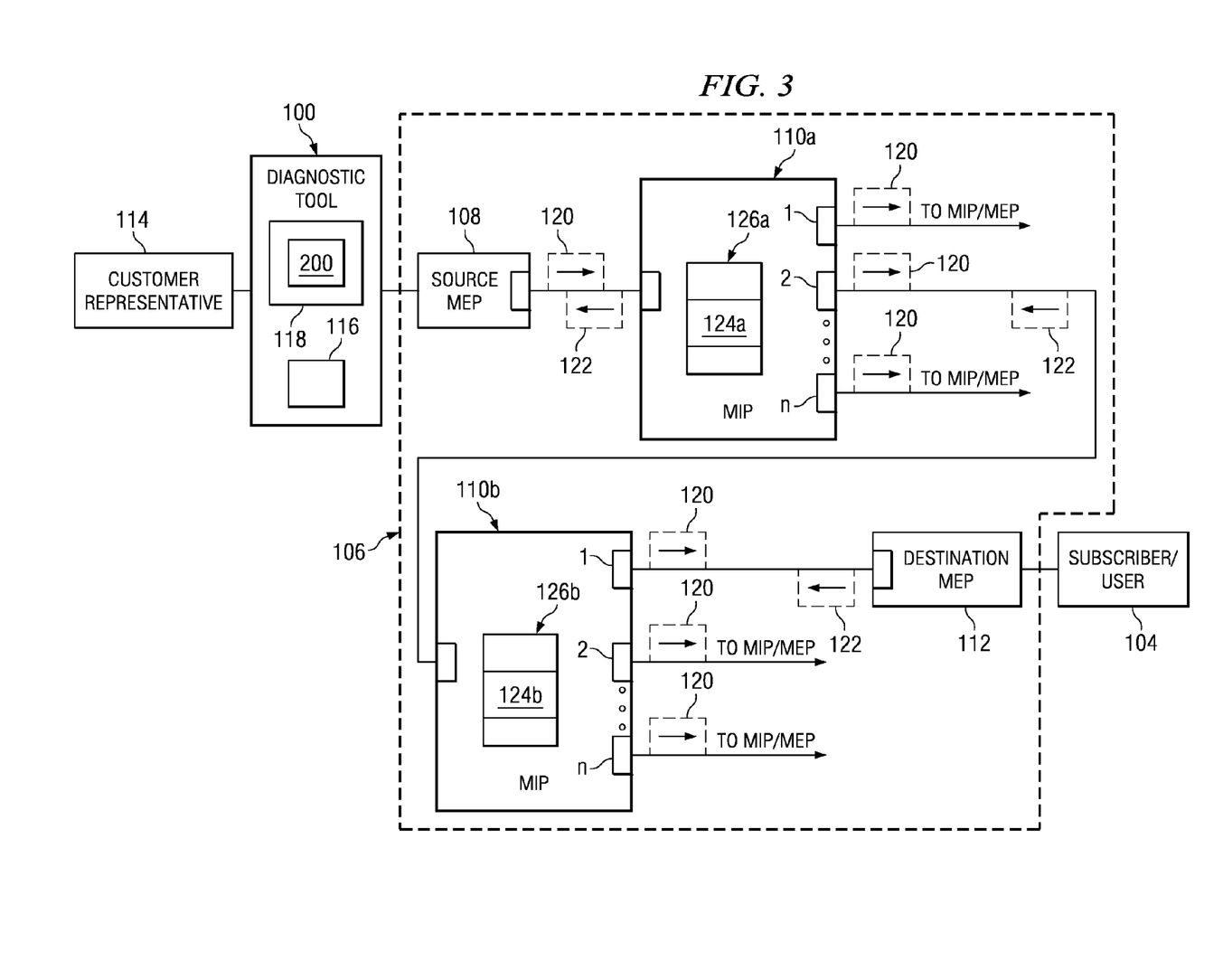
Figure 4:
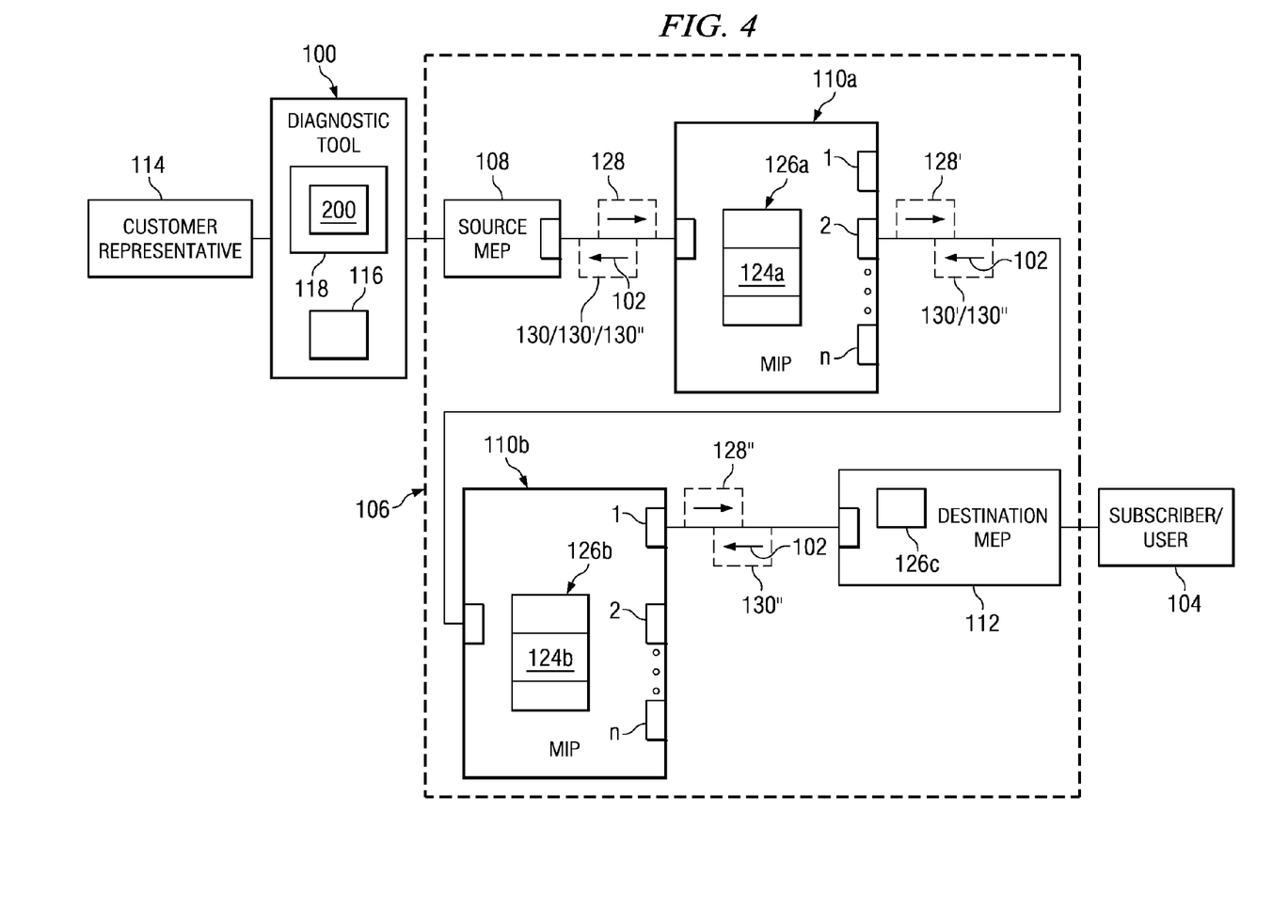

As shown in FIG. 4, the diagnostic tool 100 once it has the MAC address of the destination MEP 112 is now able to create a request message 128 and then send the request message 128 directly towards the destination MEP 112 (see steps 204 and 206 in FIG. 2). In one embodiment, the request message 128 contains (for example): (1) the recently learned MAC address of the destination MEP 112; and (2) the port ID associated with the subscriber 104 (note: the request message 128 is likely to contain additional information/requests as will be discussed in detail below with respect to the IPTV application). In this embodiment, the request message 128 is based at least in part on the 802.1ag LinkTrace standard—the contents of which are incorporated by reference herein (for more details about this see the description associated with FIGS. 7A and 7B).

The source MEP 108 sends the request message 128 via the MIPs 110a and 110b directly towards the destination MEP 112. The first MIP 110a upon receiving the request message 128 would take the recently learned MAC address located therein and inspect element 124a in database 126a to learn which port 1, 2 . . . n (e.g., port 2) it needs to use to forward the next request message 128' to the second MIP 110b. In addition, the first MIP 110a takes the port ID associated with the subscriber 104 and inspects the database 126a (or some other database) to obtain any available subscriber information 102 (e.g., entitlement information, bandwidth usage information and/or bandwidth availability information) associated with the subscriber 104. Then, the first MIP 110a would send a reply message 130 (e.g., based on the 802.1ag LinkTrace standard) which contains the retrieved/measured subscriber information 102 back to the diagnostic tool 100. Thereafter, the first MIP 110a would send the new request message 128' out the recently learned local port (e.g., port 2) directly towards the second MIP 110b.

Upon receiving the request message 128', the second MIP 110b would take the recently learned MAC address located therein and inspect element 124b in database 126b to learn which port 1, 2 . . . n (e.g., port 1) it needs to use to forward the next request message 128" to the destination MEP 112. In addition, the second MIP 110b takes the port ID associated with the subscriber 104 and inspects the database 126b (or some other database) to obtain any available subscriber information 102 (e.g., entitlement information, bandwidth usage information and/or bandwidth availability information) associated with the subscriber 104. Then, the second MIP 110b would send a reply message 130' (e.g., based on the 802.1ag LinkTrace standard) which contains the retrieved/measured subscriber information 102 back to the diagnostic tool 100. Thereafter, the second MIP 110b sends the next request message 128" out the recently learned local port (e.g., port 1) directly towards the destination MEP 112.

Upon receiving the request message 128", the destination MEP 112 takes the port ID associated with the subscriber 104 and inspects a database 126c (or some other database) to obtain any available subscriber information 102 (e.g., entitlement information, bandwidth usage information and/or bandwidth availability information) associated with the subscriber 104. Then, the destination MEP 112 would send a reply message 130" (e.g., based on the 802.1ag LinkTrace standard) which contains the received/measured subscriber information 102 back to the diagnostic tool 100. The diagnostic tool 100 receives the reply messages 130, 130' and 130" and presents the subscriber information 102 to the customer service representative 114 before they respond to the problem associated with the subscriber 104 (see steps 208 and 210 in FIG. 2). A discussion is provided next to explain how the diagnostic tool 100 can be used in an application where television channels are provided to the subscriber 104' over an IPTV network 106' (which is an application-specific layer 2 aggregation network)(see FIG. 5).

In the IPTV application, the subscriber 104' may for instance call the customer service representative 114' when he/she does not receive a particular multicast television channel (say CNN). The customer service representative 114' prior to using a multicast fault diagnostic tool may want to know whether the subscriber 104' is entitled to receive that particular multicast television channel in the first place. Plus, the customer service representative 114' may want to retrieve other subscription related information associated with the subscriber 104' like the user privileges, current bandwidth usage, available bandwidth etc. . . . prior to using a multicast fault diagnostic tool. An exemplary multicast fault diagnostic tool was described in the co-assigned U.S. patent application Ser. No. 11/469,223, filed on Aug. 31, 2006 and entitled "Diagnostic Tool and Method for Troubleshooting Multicast Connectivity Flow Problem(s) in a Layer 2 Aggregation Network" (the contents of this document are hereby incorporated by reference herein).

Figure 5:
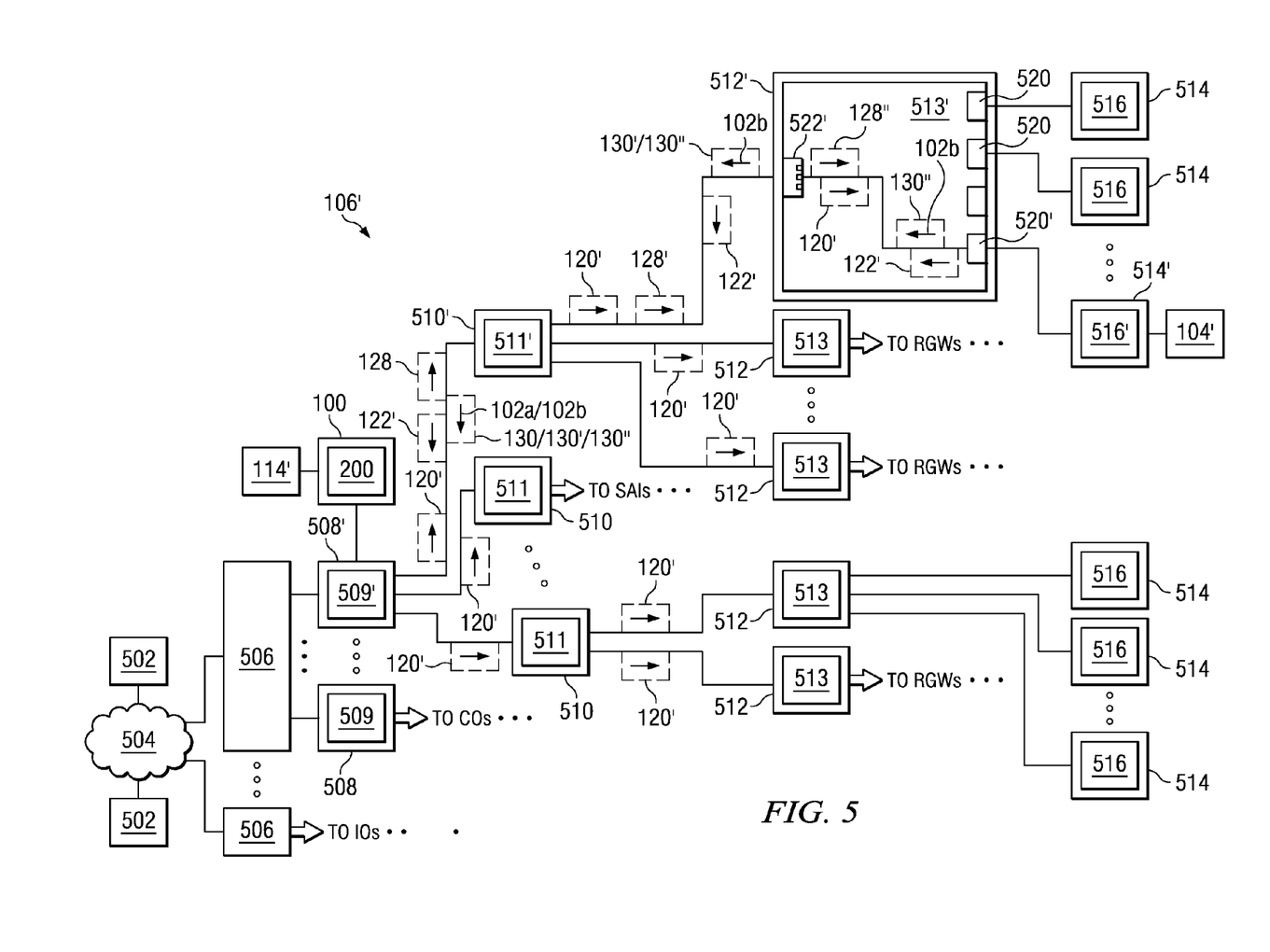
FIGS. 5-7 are diagrams which are used to help explain how the in-band diagnostic tool and method can be used to retrieve subscriber information (e.g., static subscriber information, dynamic subscriber information) from one or more nodes located within an IPTV network (which is an application specific layer 2 aggregation network) in accordance with one embodiment of the present invention.

Referring to FIG. 5, there is a block diagram illustrating an exemplary IPTV network 106' which is used to help explain how the diagnostic tool 100 and method 200 can be used to retrieve different types of subscriber information 102' in accordance with one embodiment of the present invention. As shown, the exemplary IPTV network 106' includes two super head-ends 502, a backbone network 504, multiple VHOs 506, multiple IOs 508, multiple COs 510, multiple SAIs 512 and multiple RGWs 514. In operation, each super head-end 502 receives international TV feeds and supplies those international TV feeds via the backbone network 504 to each VHO 506. Then, each VHO 506 receives local TV feeds and multicasts all of the TV feeds to their respective IO 508 (note: the diagnostic tool 100 is attached to a router 509' in IO 508'). And, each IO 508 multicasts all of the TV feeds to their respective CO 510 (which has a bridge/router 511). Then, each CO 510 multicasts all of the TV feeds to their respective SAI 512 (which includes a DSLAM 513). And, each SAI 512 then multicasts all or a portion of the TV feeds to their respective RGW 514 (which is associated with a STB 516). In this way, the subscriber 104' can interface with their STB 516' and select one of the multicast TV channels to watch on their TV. The IPTV network 106' may also provide voice (telecommunications), video-conferencing (telecommunications) and data (Internet) to the homes via DSL phone lines.

The customer service representative 114' after talking with the subscriber 104' about their problem (e.g., not being able to watch a particular television channel, say CNN) would use the diagnostic tool 100 to retrieve the user subscription data 102 which is associated with that particular subscriber 104'. As discussed below, the user subscription data 102 can include static subscriber information 102a (e.g., whether the subscriber 104' is permitted to watch the problematic television channel) and dynamic subscriber information 102b (e.g., the current downstream bandwidth availability and the current downstream bandwidth usage associated with the subscriber 104').

Prior to using the diagnostic tool 100, the customer service representative 114' would look-up a port ID (at the RGW 514') which is associated with that particular subscriber 104'. Then, the customer service representative 114' would instruct the diagnostic tool 100 to perform a discovery process to: (1) learn a MAC address of a line card 520' in the DSLAM 513' behind which resides the target RGW 514' (note: if desired the MAC address of the RGW 514' could be learned); and (2) learn the direct path through the bridge/router 511' and the DSLAM 513' to the target RGW 514'. For instance, the diagnostic tool 100 can interact with the router 509' (which is located within IO 508') to perform this discovery process as follows (see step 202 in FIG. 2):

1. The router 509' floods a MAC discover message 120' out off all of it's ports 1, 2 . . . n (see FIG. 5).

Figure 6A:
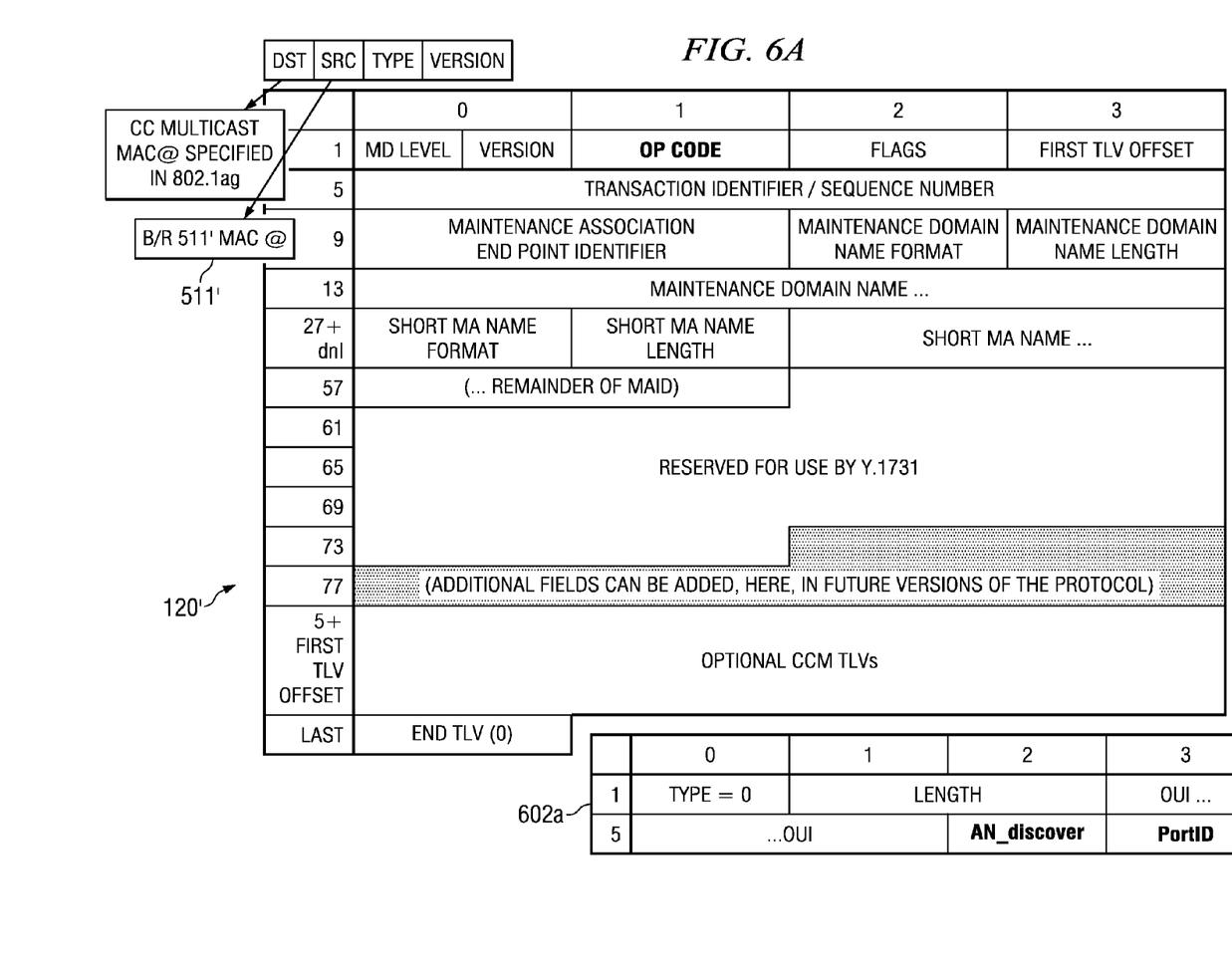

FIG. 6A is a diagram that illustrates the format of an exemplary MAC discover message 120' (e.g., based on 802.1ag Connectivity Check—the contents of which are incorporated by reference herein) (note: some fields have not been shown for clarity). The new portions associated with this MAC discover message 120' have been identified by BOLD letters to highlight the new portions relative to the traditional 802.1ag Connectivity Check message. The new portions include: (1) an OpCode (instructions to look at an organization specific TLV 602a); and (2) an organization specific TLV 602a (which includes an AN_discover and a port ID of the target RGW 514').

2. Each bridge/router 511 (three shown associated with COs 510) receives the MAC discover message 120' and floods the MAC discover message 120' out off all of it's ports 1, 2 . . . n (see FIG. 5)

3. Each DSLAM 513 (five shown associated with SAIs 512) and in particular a bridge 522 which is located therein receives the MAC discover message 120' and broadcasts it to all of the line cards 520 located therein (see FIG. 5).

4. Only the line card 520' (associated with DSLAM 513') that recognizes the port ID of the target RGW 514' will respond to the MAC discover message 120' by sending a MAC reply message 122' which contains that particular line card's MAC address (see FIG. 5).

Figure 6B:
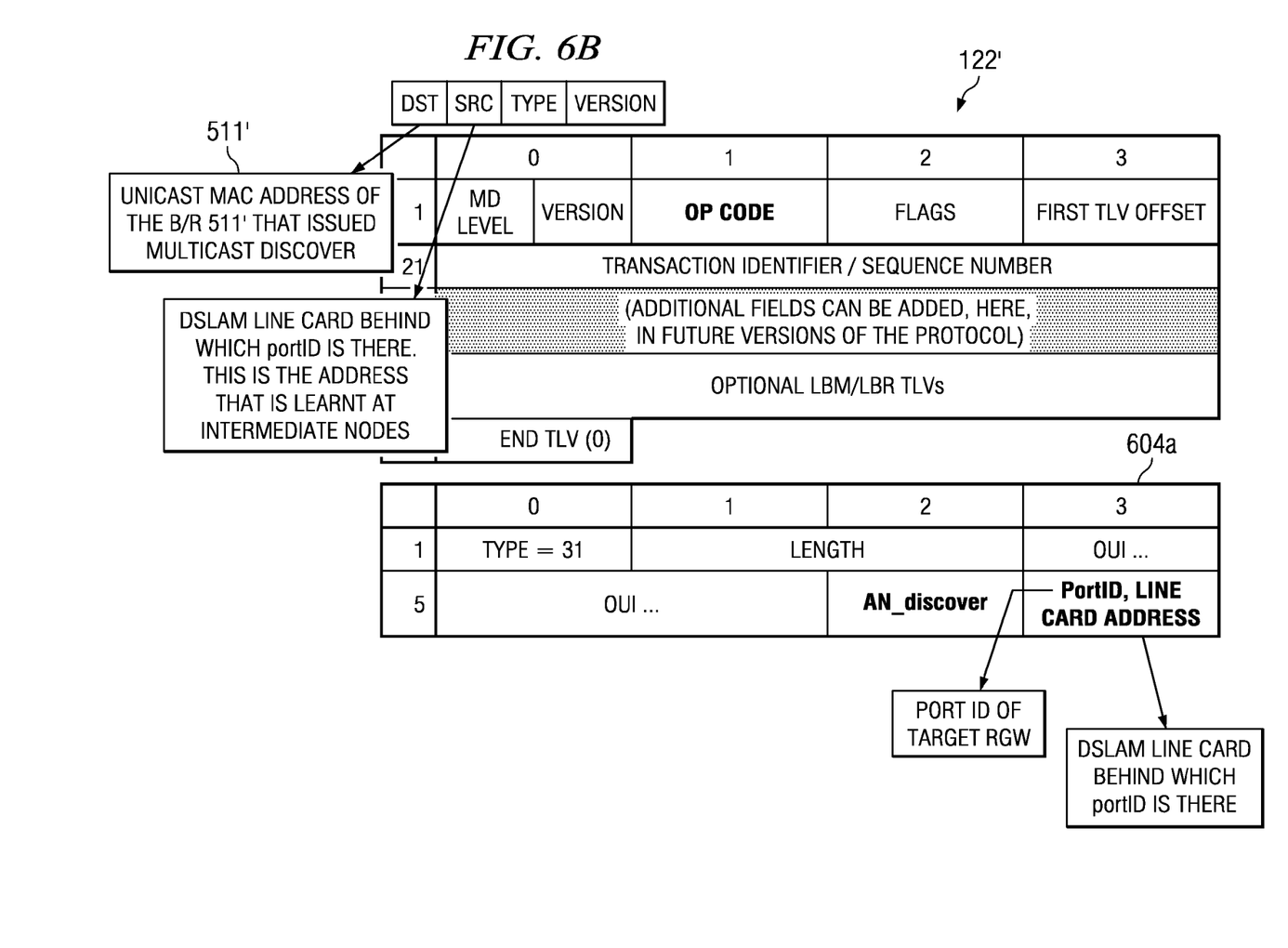

FIG. 6B is a diagram that illustrates the format of an exemplary MAC reply message 122' (e.g., based on 802.1ag Connectivity Check) (note: some fields have not been shown for clarity). The new portions associated with the MAC reply message 122' have been identified by BOLD letters to highlight the new portions relative to the traditional 802.1ag Connectivity Check message. The new portion includes an organization specific TLV 604a (which has (a) an AN_discover; (b) a port ID of the target RGW 514'; and (c) the MAC address of the line card 520' behind which resides the target RGW 514').

5. As a result of sending the MAC reply message 122', all of the intermediate nodes learn their particular local port behind which resides the target RGW 514'. These intermediate nodes in this example include: (1) the bridge 522' in DSLAM 513'; (2) the bridge/router 511' in CO 511'; and (3) the router 509' in IO 508'. Each of these intermediate nodes then creates an entry in their database/FDB which stores the [DSLAM line card's MAC address, local port].

Note 1: The discovery process would not be needed if the router 509', bridge/router 511', DSLAM 513' etc. . . . knew the MAC address of the line card 520' and their local port behind which resides the target RGW 514'.

Note 2: The frames associated with the exemplary MAC discover message 120' (shown in FIG. 6A) and the exemplary MAC reply message 122' (shown in FIG. 6B) happen to be based on a draft of the 802.1ag specification. As such, it should be appreciated that the locations of the various fields in these messages 120' and 122' could change and this change or other changes would not affect the scope of the present invention.

After this discovery process, the diagnostic tool 100 performs as follows (see steps 204, 206, 208 and 210 in FIG. 2):

1. The diagnostic tool 100 creates a request message 128 which is sent out the local port of the router 509' directly towards the bridge/router 511' (see steps 204 and 206 in FIG. 2). For example, the request message 128 can contain: (1) the recently learned MAC address of the line card 520' in DSLAM 513'; (2) the port ID associated with the target RGW 514'; (3) the multicast identifier corresponding to the problematic television channel (say, CNN); and (4) a stream type (HD, SD, radio channel . . . ) (note: in this example the stream type identifier is a request for information about the problematic television channel such as whether it is a high definition television channel or a standard television channel).

Figure 7A:
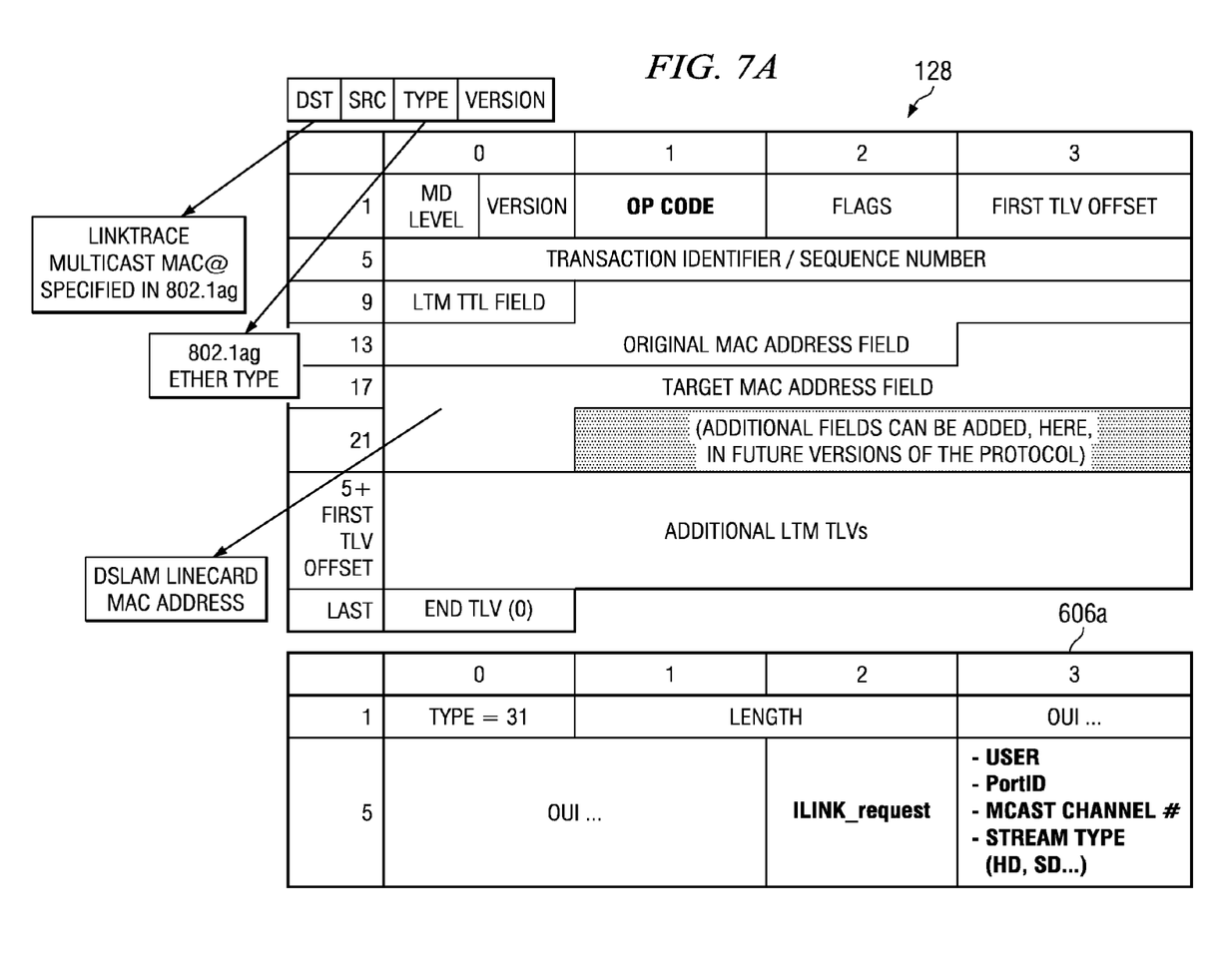

FIG. 7A is a diagram that illustrates the format of an exemplary request message 128 (e.g., based on 802.1ag LinkTrace standard—the contents of which are incorporated by reference herein) (note: some fields have not been shown for clarity). The new portions associated with the request message 128 have been identified by BOLD letters to highlight the new portions relative to the traditional 802.1ag LinkTrace message. The new portions include: (1) an OpCode (instructions for the bridge/router 511' to look at an organization specific TLV 606a); and (2) the organization specific TLV 606a (which includes: ILINK_request, User ID, MCAST Channel # (problematical television channel), Port ID of the target RGW 514' and stream type (HD, SD, radio stream) (note 1: the OpCode can be standardized in which case any bridge/router 511' implementing the 802.1ag LinkTrace standard would recognize that they need to look at and respond to the organization TLV 606a) (note 2: the OpCode can be proprietary in which case only a bridge/router 511' that is implementing the 802.1ag LinkTrace standard and is also able to recognize these instructions will look at and respond to the TLV 606a) (note 3: the MCAST Channel # can be represented as an IP address, an Ethernet MAC address or a GDA within the TLV 606a).

2A. The CO 510' and in particular the bridge/router 511' therein receives the request message 128 and obtains the learned MAC address located therein and then inspects it's database to learn which local port 1, 2 ... n it needs to use to forward the request message 128' to the correct downstream DSLAM 513'.

2B. The CO 510' and in particular the bridge/router 511' therein upon receiving the request message 128 also takes the USER/port ID so it can inspect a database to obtain any available subscriber information which in this particular case will be static subscriber information 102a. The static subscriber information 102a can include but is not limited to the following: (1) the user is permitted to watch the multicast channel; (2) the user is not permitted to watch the multicast channel; (3) the link speed; (4) the user is subscribed to high speed internet; and (5) the user is not subscribed to high speed internet. Then, the bridge/router 511' would send a reply message 130 (e.g., based on the 802.1ag LinkTrace standard) which contains the static subscriber information 102a back to the diagnostic tool 100.

Figure 7B:
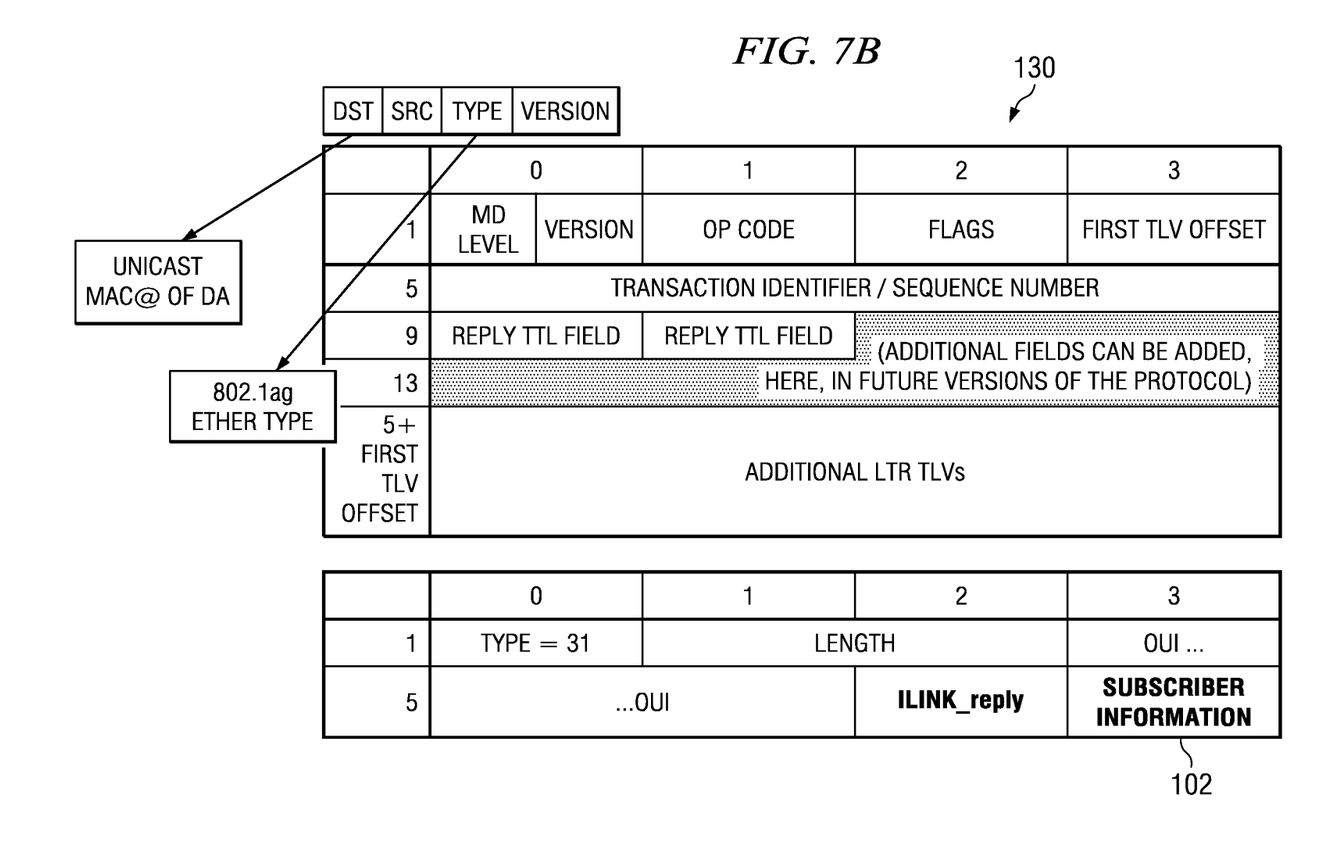

FIG. 7B is a diagram that illustrates the format of an exemplary reply message 130 (e.g., based on 802.1ag LinkTrace standard) (note: some fields have not been shown for clarity). The new portions associated with the reply message 130 have been identified by BOLD letters to highlight the new portions relative to the traditional 802.1ag LinkTrace message. The new portions include an specific TLV 608a (which has a ILINK_reply and the subscriber information 102a).

3A. The DSLAM 513' and in particular the bridge 522' therein receives the request message 128' and obtains the learned MAC address located therein and then inspects it's database/FDB to learn which local port 1, 2 ... n it needs to use to forward the request message 128" to the correct downstream line card 520'.

3B. The DSLAM 513' and in particular the bridge 522' upon receiving the request message 128' also takes the USER/port ID so it can inspect a database to obtain any available subscriber information 102. In this example, assume the bridge 522' does not contain or have access to any subscriber information 102. Then, the bridge 522' sends a reply message 130' (e.g., based on the 802.1ag LinkTrace standard) which does not contain any subscriber information 102 back to the diagnostic tool 100.

4. The line card 520' (within the DSLAM 513') upon receiving the request message 128" also takes the USER/port ID so it can inspect a database to obtain any available subscriber information 102 which in this case is dynamic subscriber information 102b. The dynamic subscriber information 102b can include but is not limited to the following: (1) the downstream bandwidth available for the user 104' of the target device 514'; (2) the current downstream bandwidth usage by the user 104' of the target device 514'; (3) the upstream bandwidth available for the user 104' of the target device 514'; (4) the current upstream bandwidth usage by the user 104' of the target device 514'; (5) the downstream bandwidth available for a particular stream type sent to the target device 514'; and (6) the current downstream bandwidth usage for a particular stream type sent to the target device 514'. Then, the line card 520' would send a reply message 130" (e.g., based on the 802.1ag LinkTrace standard) which contains the dynamic subscriber information 102b back to the diagnostic tool 100.

5. The diagnostic tool 100 receives and analyzes/presents the subscriber information 102a and 102b within the reply messages 130, 130' and 130". Then, the customer service representative 114' can review the subscriber information 102 before taking further action to respond to the particular problem reported by the subscriber 104' (see steps 206 and 208 in FIG. 2).

Note 1: In this example, the DSLAM 513' did not forward the request 128" to the target RGW 514' since in this application it normally does not contain subscriber information 102.

Note 2: The frames associated with the exemplary request message 128 (shown in FIG. 7A) and the exemplary reply message 130 (shown in FIG. 7B) happen to be based on a draft of the 802.1ag specification. As such, it should be appreciated that the locations of the various fields in these messages 128 and 130 could change and this change or other changes would not affect the scope of the present invention.

Although multiple embodiments of the present invention have been illustrated in the accompanying Drawings and described in the foregoing Detailed Description, it should be understood that the present invention is not limited to the disclosed embodiments, but is capable of numerous rearrangements, modifications and substitutions without departing from the spirit of the invention as set forth and defined by the following claims.

The invention claimed is:

1. A diagnostic tool, comprising:
an operator interface and a computer which together facilitate the following:
creating a request message which contains information including a port identification (ID) that is associated with a target device, a multicast channel corresponding to a television channel, and a stream type corresponding to a high definition television channel, a standard television channel, or a streaming radio channel;
sending the request message to a first node in a layer 2 aggregation network associated with said target device;
receiving a first reply message which contains static subscriber information from said first node in the layer 2 aggregation network, where said first node also forwards the request message to a second node associated with said target device;
receiving a second reply message which contains dynamic subscriber information from said second node;
analyzing the static subscriber information and the dynamic subscriber information respectively received from said first node and said second node;
wherein said static subscriber information includes one or more of the following: user permitted to watch the multicast channel, user not permitted to watch the multicast channel, link speed, user subscribed to high speed internet, and user not subscribed to high speed internet; and wherein said dynamic subscriber information includes one or more of the following: downstream bandwidth available for user of said target device, current downstream bandwidth usage by user of said target device, upstream bandwidth available for user of said target device, current upstream bandwidth usage by user of said target device, downstream bandwidth available for a particular stream type sent to said target device, and current downstream bandwidth usage by a particular stream type sent to said target device.

2. The diagnostic tool of claim 1, wherein said computer further discovers a MAC address associated with said target device by:
flooding a MAC discover message which contains the port ID of said target device through at least a portion of an Internet Protocol Television network; and
receiving a MAC reply message which contains the MAC address from said target device or from one of the nodes associated said target device.

3. The diagnostic tool of claim 1, wherein:
said first node is a bridge or a router; and
said second node is a Digital Subscriber Line Access Multiplexer.

4. A method for retrieving subscriber information from one or more nodes located within an Internet Protocol Television network, said method comprising the steps of:
creating a request message in the form of a layer 2 message which contains information including a port identification (ID) that is associated with a target device, a multicast channel corresponding to a television channel, and a stream type corresponding to a high definition television channel, a standard television channel, or a streaming radio channel;
sending the request message to a first node in a layer 2 aggregation network associated with said target device, the first node responding with information regarding said target device and forwarding the request message towards said target device;
receiving a first reply message which contains static subscriber information from said first node in the layer 2 aggregation network, where said first node also forwards the request message to a second node associated with said target device;
receiving a second reply message which contains dynamic subscriber information from said second node;
analyzing the static subscriber information and the dynamic subscriber information respectively received from said first node and said second node;
wherein said static subscriber information includes one or more of the following: user permitted to watch the multicast channel, user not permitted to watch the multicast channel, link speed, user subscribed to high speed internet, and user not subscribed to high speed internet; and
wherein said dynamic subscriber information includes one or more of the following: downstream bandwidth available for user of said target device, current downstream bandwidth usage by user of said target device,
upstream bandwidth available for user of said target device, current upstream bandwidth usage by user of said target device, downstream bandwidth available for a particular stream type sent to said target device, and
current downstream bandwidth usage by a particular stream type sent to said target device.

5. The method of claim 4, wherein said method further comprises discovering a MAC address that is associated with said target device by:
flooding a MAC discover message which contains the port ID of said target device through at least a portion of the Internet Protocol Television network; and
receiving a MAC reply message which contains the MAC address from said target device or from one of the nodes associated said target device.

6. The method of claim 4, wherein:
said first node is a bridge or a router; and
said second node is a Digital Subscriber Line Access Multiplexer.

7. An Internet Protocol Television Network, comprising:
a diagnostic tool;
a bridge or a router; and
a Digital Subscriber Line Access Multiplexer; and
said diagnostic tool retrieves subscriber information about a target device from said bridge/router and said Digital Subscriber Line Access Multiplexer by performing the following steps:
creating a request message in the form of a layer 2 message which contains information including a port identification (ID) that is associated with said target device, a multicast channel corresponding to a television channel, and a stream type corresponding to a high definition television channel, a standard television channel, or a streaming radio channel;
sending the request message to said bridge/router which is associated with said target device in a layer 2 aggregation network, said bridge/router responding with information regarding said target device and forwarding the request message towards said target device;
receiving a first reply message which contains static subscriber information from said bridge/router in the layer 2 aggregation network, where said bridge/router also forwards the request message to said Digital Subscriber Line Access Multiplexer;
receiving a second reply message which contains dynamic subscriber information from said Digital Subscriber Line Access Multiplexer;
analyzing the static subscriber information and the dynamic subscriber information respectively received from said bridge/router and said Digital Subscriber Line Access Multiplexer;
wherein said static subscriber information includes one or more of the following: user permitted to watch the multicast channel, user not permitted to watch the multicast channel, link speed, user subscribed to high speed internet, and user not subscribed to high speed internet; and
wherein said dynamic subscriber information includes one or more of the following: downstream bandwidth available for user of said target device, current downstream bandwidth usage by user of said target device,
upstream bandwidth available for user of said target device, current upstream bandwidth usage by user of said target device, downstream bandwidth available for a particular stream type sent to said target device, and current downstream bandwidth usage by a particular stream type sent to said target device.

* * * * *